(No Model.)
J. A. MOUNCE & D. L. DELANEY.
AUTOMATIC VEHICLE BRAKE.
No. 528,605. Patented Nov. 6, 1894.
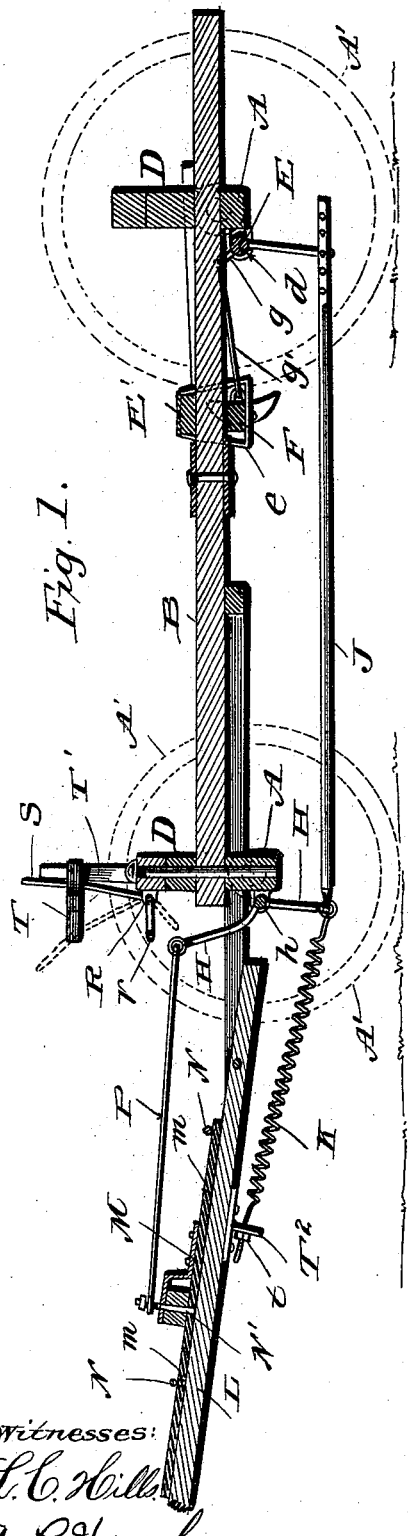
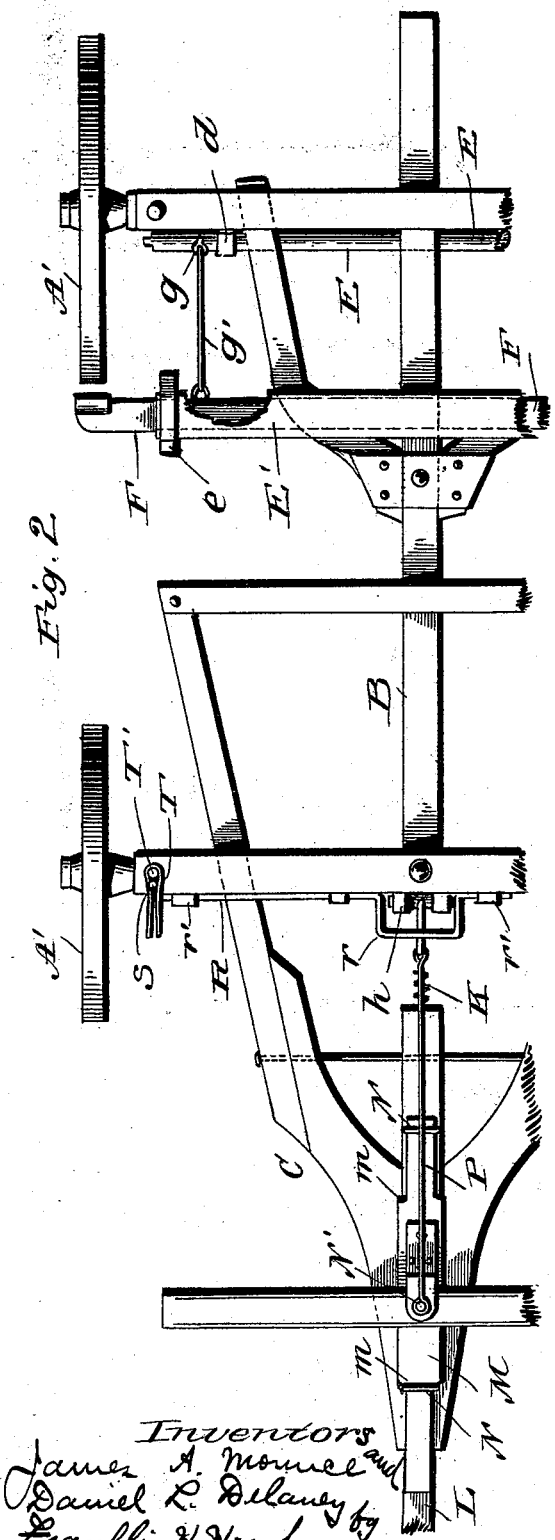
Witnesses:
Inventors
James A. Mounce and
Daniel L. Delaney
by Franklin H. Hough
Atty.

UNITED STATES PATENT OFFICE.

JAMES A. MOUNCE AND DANIEL L. DELANEY, OF FREDERICKTOWN, MISSOURI.

AUTOMATIC VEHICLE-BRAKE.

SPECIFICATION forming part of Letters Patent No. 528,605, dated November 6, 1894.

Application filed May 23, 1894. Serial No. 512,226. (No model.)

*To all whom it may concern:*

Be it known that we, JAMES A. MOUNCE and DANIEL L. DELANEY, citizens of the United States, residing at Fredericktown, in the county of Madison and State of Missouri, have invented certain new and useful Improvements in a Combined Automatic Vehicle Brake and Evener; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in automatic wagon brakes and eveners for the tongues thereof, whereby the brakes will be applied when there is no pulling on the evener, as when the vehicle is standing, or when the same is going down a grade, provision being made to hold the brake from engagement with the wheel, when it is desired to back the vehicle.

Another important feature of the invention is in the construction of the sliding, spring actuated evener, which prevents any sudden jerk to the team or wagon while starting or when in motion, as the first strain on starting is taken up by a strong spring, this feature being of great importance where spirited or balky horses are utilized in drawing loaded wagons, as such horses are frequently apt to start with a jerk and suddenly stop.

To these ends and to such others as the invention may pertain, the same consists further in the novel construction, combination and adaptation of the parts as will be hereinafter more fully described and then specifically defined in the appended claims.

We clearly illustrate our invention in the accompanying drawings, which with the letters of reference marked thereon form a part of this specification, and in which drawings similar letters of reference indicate like parts throughout both views, in which—

Figure 1, is a perspective view of our automatic brake and evener. Fig. 2, is a perspective view of the spring actuated evener.

Reference now being had to the details of the drawings by letter, A, A, represent the forward and rear axles of an ordinary wagon with wheels A', reach B, hounds C, and bolsters D. To the rear axle is pivoted at the points $d$, $d$, the rock bar E having connections with the brake bar F, supported from the cross bar E' by means of the metallic straps $e$ $e$. Secured to the said rock bar at a point preferably near its middle, is the lever G, and this lever or bent rod is disposed in a plane at an obtuse angle to that of the staples $g$, to which the rods $g'$ are connected. Pivoted to the front axle on its front face at $h$ is the lever H, having connection at its lower end with the forward end of the lever J forming a connection between the lower end of the said lever H and the lever G. K is a stiff coiled spring connected at one end to the lower end of the pivoted lever H, its forward end being fastened to the tongue L.

On the upper surface of the tongue is located the sliding evener plate M having the shoulders $m$, and the said evener is limited in its reciprocating movement by the said shoulders coming in contact with the staples N driven into the upper surface of the tongue. The pin N' forming the pivot for the evener O projects above the upper surface of the evener, and to it one end of the rod P is secured its other end hooked into a loop at the upper end of the pivoted rod H.

R is a hand lever having the downwardly bent portion $r$, and the said lever is journaled to the front face of the forward bolster at $r'$, and $r'$ and is held in a disengaged relation by means of the handle S being clamped between the arms T, spring actuated and fastened to the upright T'.

The operation of the device is as follows:— When the horses are harnessed and hitched to the evener and are started, the sliding block to which the evener is held moves slightly forward under the tension of the strong coiled spring, until the shoulders described, come in contact with the staples driven securely into the upper surface of the tongue at which time the drawing of the vehicle is commenced, the brakes are released from the wheels, by means of the rods and lever connection between the rock shaft and the evener, and it will be readily seen that when the wagon comes to a standstill on a level or a down grade, as soon as the strain from the pulling horses, is released, the heavy coiled spring returns the sliding evener support until the shoulders near the rear end thereof come in contact with the staple, at the same time applying the brakes to the rear wheels.

The hand lever secured to the front bolster is provided to release the brakes when it is desired to back the vehicle, by simply lowering the bent portion r between the front face of the forward axle and the upper arm of the pivoted lever H.

The brake is applied by the spring and is always set except when the team is pulling or the loop r is forced behind the upper end of the lever H. This is done in order to release the brake when the horses are not pulling.

If preferred the forward end of the coiled spring may be adjustably held to a downwardly extending plate T secured to the under side of the tongue of the vehicle, and provided with a nut t for tightening the said spring. We also prefer to use stay chains in connection with the evener to prevent one horse walking faster than the other, hence producing a see-saw motion.

Having thus described our invention, what we claim to be new, and desire to secure by Letters Patent, is—

1. In combination with the running gear of a vehicle and brake as described, a lever pivoted to the front axle having connection with the rock shaft and with a sliding bar or plate on the tongue, said plate carrying an evener, a hand lever with a downwardly bent loop portion, and a coiled spring having one end secured to the under surface of the tongue its other end fastened to an arm of the said lever pivoted to the axle, substantially as shown and described.

2. In combination with the automatic brakes a lever J, the pivoted lever H, a spring connecting the lower end of the pivoted lever and the under surface of the tongue, the lever or rod connecting the evener pin and the upper end of the pivoted rod H, and the hand lever R with its bent portion r to allow the brakes to be held from engagement with the wheels, and the vehicle to be backed.

3. In combination with the automatic brakes as described, the lever and rod connections therewith, and a sliding plate M mounted on the upper face of the tongue and having shoulders m, the staples N for limiting the movement of said plate, and the spring and lever connection for normally holding the sliding plate at its farthest rearward throw all substantially as shown and described.

In testimony whereof we affix our signatures in presence of two witnesses.

JAMES A. MOUNCE.
DANIEL L. DELANEY.

Witnesses:
J. F. GLAVES,
A. MILLER.